(12) United States Patent
Labrecque et al.

(10) Patent No.: US 10,054,050 B2
(45) Date of Patent: Aug. 21, 2018

(54) LOW NOISE AEROENGINE INLET SYSTEM

(71) Applicant: PRATT & WHITNEY CANADA CORP., Longueuil (CA)

(72) Inventors: Michel Labrecque, St-Bruno (CA); Vincent Couture-Gagnon, Boucherville (CA); Richard Ullyott, St-Bruno (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 759 days.

(21) Appl. No.: 14/463,114

(22) Filed: Aug. 19, 2014

(65) Prior Publication Data

US 2016/0053686 A1 Feb. 25, 2016

(51) Int. Cl.
| | |
|---|---|
| *F01D 17/08* | (2006.01) |
| *F02C 7/045* | (2006.01) |
| *F02C 7/042* | (2006.01) |
| *F02C 7/052* | (2006.01) |
| *F01D 17/10* | (2006.01) |

(Continued)

(52) U.S. Cl.
CPC .............. *F02C 7/045* (2013.01); *F01D 17/08* (2013.01); *F01D 17/105* (2013.01); *F02C 7/042* (2013.01); *F02C 7/05* (2013.01); *F02C 7/052* (2013.01); *F02K 3/025* (2013.01)

(58) Field of Classification Search
CPC .......... F02C 7/045; F02C 7/042; F02C 7/052; F02C 7/05; B64D 2033/0246; B64D 2033/0206

See application file for complete search history.

(56) References Cited

U.S. PATENT DOCUMENTS 2,407,194 A * 9/1946 Vokes .................... F02C 7/052
                                                  55/302
2,752,111 A * 6/1956 Schairer ................. F02C 7/047
                                                  244/57

(Continued)

FOREIGN PATENT DOCUMENTS

| EP | 2199204 A2 | 6/2010 |
|---|---|---|
| FR | 2906569 A1 | 4/2008 |

(Continued)

OTHER PUBLICATIONS

Extended European Search Report dated Jan. 14, 2016 issued on Applicant's corresponding European Patent Application No. 15181537.0-1607.

(Continued)

Primary Examiner — Justin Seabe
(74) Attorney, Agent, or Firm — Norton Rose Fulbright Canada LLP

(57) ABSTRACT

An aeroengine has an inlet system with a forward end with respect to a flight direction. The inlet system includes a main inlet duct for selectively directing a first air flow from a forward main intake opening of the main inlet duct to a compressor rotor, the forward main intake opening being defined at the forward end of the inlet system and a secondary inlet duct for directing a second air flow from a secondary intake opening of the secondary inlet duct to the compressor rotor only when the main inlet duct is closed. A control apparatus is provided for selecting the first and second air flow to enter into the compressor rotor.

18 Claims, 4 Drawing Sheets

(51) Int. Cl.
*F02C 7/05* (2006.01)
*F02K 3/02* (2006.01)

(56) References Cited

U.S. PATENT DOCUMENTS

| | | | |
|---|---|---|---|
| 3,421,296 A * | 1/1969 | Beurer | B64D 33/02 |
| | | | 209/710 |
| 3,532,129 A | 10/1970 | Ward et al. | |
| 3,533,486 A | 10/1970 | Paulson | |
| 3,534,548 A * | 10/1970 | Connors | F02C 7/042 |
| | | | 415/116 |
| 3,575,259 A | 4/1971 | Wilkinson | |
| 3,611,724 A | 10/1971 | Kutney | |
| 3,618,700 A | 11/1971 | Bond | |
| 3,623,494 A | 11/1971 | Poucher | |
| 3,666,043 A | 5/1972 | Eschenburg | |
| 3,736,750 A | 6/1973 | Britt | |
| 3,820,626 A | 6/1974 | Bonneaud et al. | |
| 3,915,413 A | 10/1975 | Sargisson | |
| 3,998,048 A | 12/1976 | Derue | |
| 4,047,911 A * | 9/1977 | Krojer | F02C 7/05 |
| | | | 244/53 B |
| 4,075,833 A | 2/1978 | Sargisson | |
| 4,155,221 A | 5/1979 | Dhoore et al. | |
| 4,192,336 A | 3/1980 | Farquhar et al. | |
| 4,250,703 A * | 2/1981 | Norris | B64D 33/02 |
| | | | 244/53 B |
| 4,346,860 A * | 8/1982 | Tedstone | F02C 7/05 |
| | | | 244/53 B |
| 4,463,772 A | 8/1984 | Ball | |
| 4,534,167 A | 8/1985 | Chee | |
| 4,881,367 A | 11/1989 | Flatman | |
| 5,000,399 A | 3/1991 | Readnour | |
| 5,315,820 A | 5/1994 | Arnold | |
| 5,702,231 A | 12/1997 | Dougherty | |
| 5,782,082 A * | 7/1998 | Hogeboom | F02C 7/045 |
| | | | 181/213 |
| 6,089,505 A | 7/2000 | Gruensfelder et al. | |
| 6,609,592 B2 | 8/2003 | Wilson | |
| 6,896,099 B2 | 5/2005 | Porte | |
| 7,048,229 B2 | 5/2006 | Sanders et al. | |
| 7,429,018 B1 | 9/2008 | Kechely | |
| 7,588,212 B2 | 9/2009 | Moe | |
| 7,857,257 B2 * | 12/2010 | Schwarz | B64D 33/02 |
| | | | 244/53 B |
| 7,938,224 B2 | 5/2011 | Frustie et al. | |
| 8,276,707 B2 | 10/2012 | Raimbault et al. | |
| 8,286,654 B2 | 10/2012 | Prasad et al. | |
| 8,529,188 B2 | 9/2013 | Winter | |
| 8,579,076 B2 | 11/2013 | Ayle et al. | |
| 2011/0000548 A1 | 1/2011 | Sanders et al. | |
| 2012/0325325 A1 | 12/2012 | Quackenbush et al. | |

FOREIGN PATENT DOCUMENTS

| | | |
|---|---|---|
| GB | 761235 A | 11/1956 |
| GB | 2266340 A | 10/1993 |
| WO | 0236951 | 5/2002 |

OTHER PUBLICATIONS

Extended European Search Report dated Jan. 14, 2016 issued on Applicant's corresponding European Patent Application No. 15181596.6-1607.

Extended European Search Report dated Jan. 14, 2016 issued on Applicant's corresponding European Patent Application No. 15181618.8-1607.

Extended European Search Report dated Jan. 14, 2016 issued on Applicant's corresponding European Patent Application No. 15181594.1-1607.

* cited by examiner

LOW NOISE AEROENGINE INLET SYSTEM

TECHNICAL FIELD

The described subject matter relates generally to aero engines and, more particularly to aircraft engine inlet systems.

BACKGROUND OF THE ART

Future turboprop aircraft will be larger, heavier and with more powerful engines. Traditionally the aircraft engine industry has pointed to propellers as the predominant noise source, but with modern electronic propeller control strategies, propeller contribution to the total noise of the engine is reduced and compressor noise propagating from the engine intake can become the predominant source of noise. This is particularly true during the approach phase of flight just before landing. At approach conditions the performance of the engine inlet is less important than in other flight phases since the engine operates at lower power and the conditions are not maintained for long enough to be significant for blocking fuel burn. Consequently, the industry has made a great effort to improve inlet noise attenuation capabilities, particularly under flight approach conditions.

Accordingly, there is a need to provide an improved engine inlet system for aircraft gas turbine engines.

SUMMARY

In one aspect, there is provided an aeroengine having a compressor inlet system comprising a main inlet duct for directing a first air flow from a main intake opening to a compressor, the main intake opening defined at a forward end of the inlet system with respect to a flight direction, a secondary inlet duct for directing a second air flow from a secondary intake opening to the compressor, and a control apparatus for selecting which of the first and second air flows to provide to the compressor.

In another aspect, there is provided an aeroengine having an inlet system with a forward end with respect to a flight direction, the inlet system comprising a main inlet duct for selectively directing a first air flow from a forward main intake opening of the main inlet duct to a compressor rotor, the forward main intake opening being defined at the forward end of the inlet system, an inertial particle separator (IPS) duct connected in fluid communication with the main inlet duct and extending rearward for directing a portion of the first air flow to bypass the compressor rotor and to be discharged through an exit opening of the IPS, the exit opening being disposed in a rear location with respect to the forward end of the inlet system, and a valve mounted to the main inlet duct in a location upstream of the IPS duct with respect to the first air flow for selectively closing the main inlet duct to discontinue the first air flow such that the IPS duct draws a second air flow from the exit opening and directs the second air flow to the compressor rotor.

In a further aspect, there is provided an aeroengine having an inlet system with a forward end with respect to a flight direction, the inlet system comprising a main inlet duct connected in fluid communication with an annular duct for selectively directing a first air flow from a forward main intake opening of the main inlet duct to a compressor rotor located downstream of the annular duct with respect to the first air flow, the forward main intake opening being defined at the forward end of the inlet system, and a secondary inlet duct having a secondary intake opening and extending substantially in a transverse direction with respect to the flight direction and being connected in fluid communication with the annual duct, the secondary inlet duct selectively directing a secondary air flow from the secondary intake opening through the annular duct to the compressor rotor, the inlet system including a valve apparatus having a main valve for selectively closing the main inlet duct to discontinue the first air flow, and a secondary valve device for selectively closing the secondary inlet opening duct and being only open when the main inlet duct is open.

Further details and other aspects of the described subject matter will be apparent from the detailed description and drawings included below.

DESCRIPTION OF THE DRAWINGS

Reference is now made to the accompanying figures in which:

FIG. 5 is a schematic partial cross-sectional view of the engine of FIG. 4, illustrating a forward intake opening of the dedicated secondary inlet opening according to another embodiment.

It will be noted that throughout the appended drawings, like features are identified by like reference numerals.

DETAILED DESCRIPTION

Figure 1:
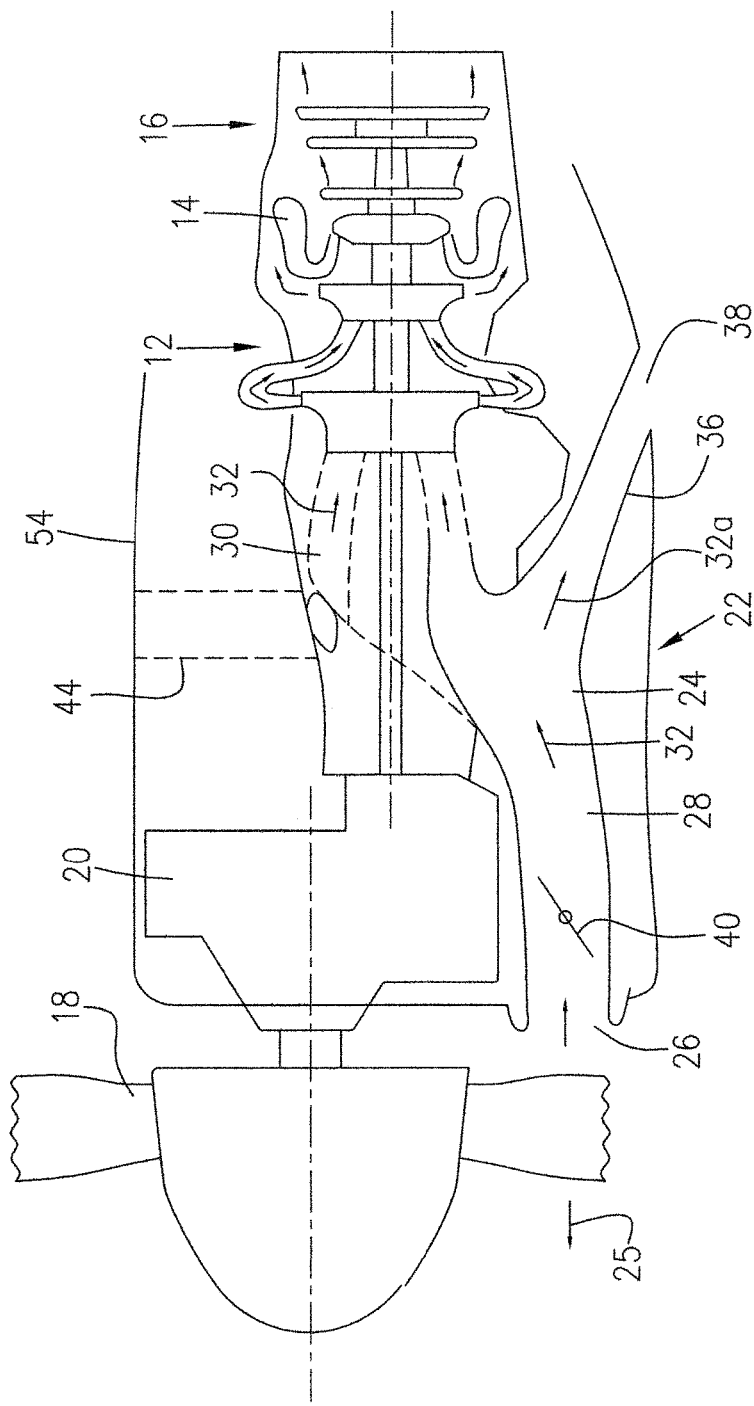
FIG. 1 is a schematic side cross-sectional view of turboprop aeroengine as an example illustrating application of the described subject matter.

FIG. 1 illustrates a turboprop aeroengine as an example of the application of the described subject matter, which generally includes in serial flow communication a compressor section 12 for pressurizing air, a combustor 14 in which the pressurized air is mixed with fuel and ignited for generating an annular stream of hot combustion gases, and a turbine section 16 for extracting energy from the combustion gases to drive compressor rotors in the compressor section 12 and to further drive a propeller 18 through a reduction gear box 20.

It should be noted that the terms downstream and upstream are defined generally with respect to the direction of the air flow entering into and passing through the engine, indicated by arrows in FIG. 1, unless otherwise specified. The terms forward, rearward and transverse are defined generally with respect to the flight direction indicated by arrow 25 in FIG. 1, of the aircraft to which the turboprop aeroengine is mounted, unless otherwise specified.

The turboprop aeroengine may have a main inlet duct 24 for selectively directing a first air flow indicated by arrows 32 from a forward main intake opening 26 to a first compressor rotor (not numbered) of the compressor section 12.

The inlet duct 24 according to one embodiment, may have an upstream portion 28 (intake portion) and a downstream portion 30 (engine inlet portion) which may be annular around the power shaft (not numbered) of the engine, and may be positioned immediately upstream the first compressor rotor of the compressor section 12, to direct the first air flow 32 in an annular stream toward the first compressor rotor of the compressor section 12. The main intake opening 26 may be defined at a forward end of the upstream portion 28 of the main inlet duct 24 and may thereby form a forward end of the inlet system 22. The forward main intake opening 26 defined at the forward end of an inlet system 22 may be located at a forward end of a nacelle (an outer skin 54 of the nacelle is shown) of the aeroengine immediately behind the propeller 18.

Referring to FIGS. 1-4 and according to one embodiment, the upstream portion 28 of the inlet duct 24 may have for example, a substantially rectangular cross-section (see FIG. 4) extending rearwardly from the main inlet opening 26 and being connected with the annular downstream portion 30.

An inertial particle separator (IPS) duct 36 according to one embodiment, may be provided in the inlet system 22, and may be connected in fluid communication with the main inlet duct 24 at a location for example immediately upstream of the annular downstream portion 30, extending rearwardly and terminating at an exit opening 38 of the main inlet duct 24. A portion of the first inlet airflow 32 may form a bypass air flow indicated by arrow 32a (see FIG. 2), which may be directed through the IPS duct 36 to bypass the compressor section 12 and may be discharged from the exit opening 38. The first inlet air flow 32 flows substantially rearward through the upstream portion 28 of the inlet duct 24 and a major portion of the first inlet air flow 32 is guided to change direction in order to enter the annular downstream portion 30 while a small portion of the first air flow 32 continues in the substantially rearward direction to enter the IPS duct 36 to form the bypass air flow 32. Particles and debris if any, carried by the first inlet air flow 32, will keep the motion thereof substantially in the rearward direction due to the inertia thereof, and therefore, together with the bypass air flow 32a, pass through the IPS duct 36, as shown in an operation model of the aeroengine for cruise flight and take off (see FIG. 2). In this operation model, the IPS duct 36 functions as a particle separator to separate fine particles and debris from the first inlet air flow 32, into the bypass airflow 32a to be discharged out of the engine.

The inlet system 22 according to one embodiment may provide a control apparatus (not numbered) which may be a valve 40 actuatable by an actuator 42 for selecting an engine operation mode of the aeroengine. The valve 40 may be mounted to or disposed within the main inlet duct 24 in a location upstream of the IPS duct 36, for example close to the main intake opening 26 for selectively opening or closing the main inlet duct 24 in order to continue or discontinue the first inlet air flow 32.

Figure 2:
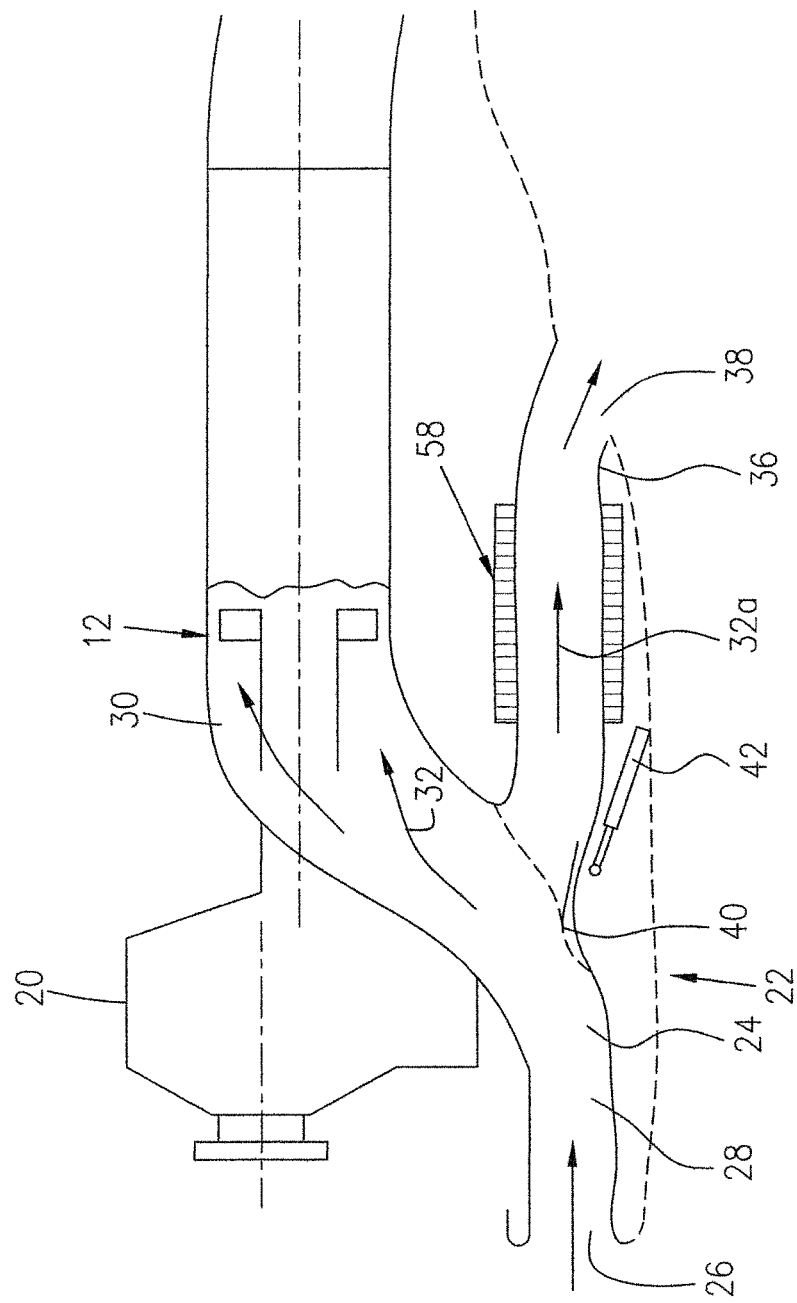
FIG. 2 is a schematic partial cross-sectional view of the turboprop aeroengine of FIG. 1, illustrating an inlet system according to one embodiment, operated to use a main inlet duct under cruise flight and take-off conditions.

When the valve 40 is open, the main inlet duct 24 allows the first inlet air flow 32 to pass therethrough and the bypass flow 32a to pass through the IPS duct 36, as shown in the engine operation mode of FIG. 2.

When the aeroengine is operated under flight condition of approaching or landing, the valve 40 may be actuated to close the main inlet duct 24 (see FIG. 3) in order to discontinue the first inlet air flow 32. When the first inlet air flow 32 discontinues, there is no more bypass air flow 32a passing through the IPS duct 36. A low pressure which is lower than an ambient air pressure, will be created within the annular downstream portion 30 of the main inlet duct 24 such that the IPS duct 36 will draw a second inlet air flow indicated by arrow 34 from the exit opening 38 and will direct the second inlet air flow 34 through the annular portion 30 of the main inlet duct 24 to the first compressor rotor of the compressor section 12 (see FIG. 3).

Figure 3:
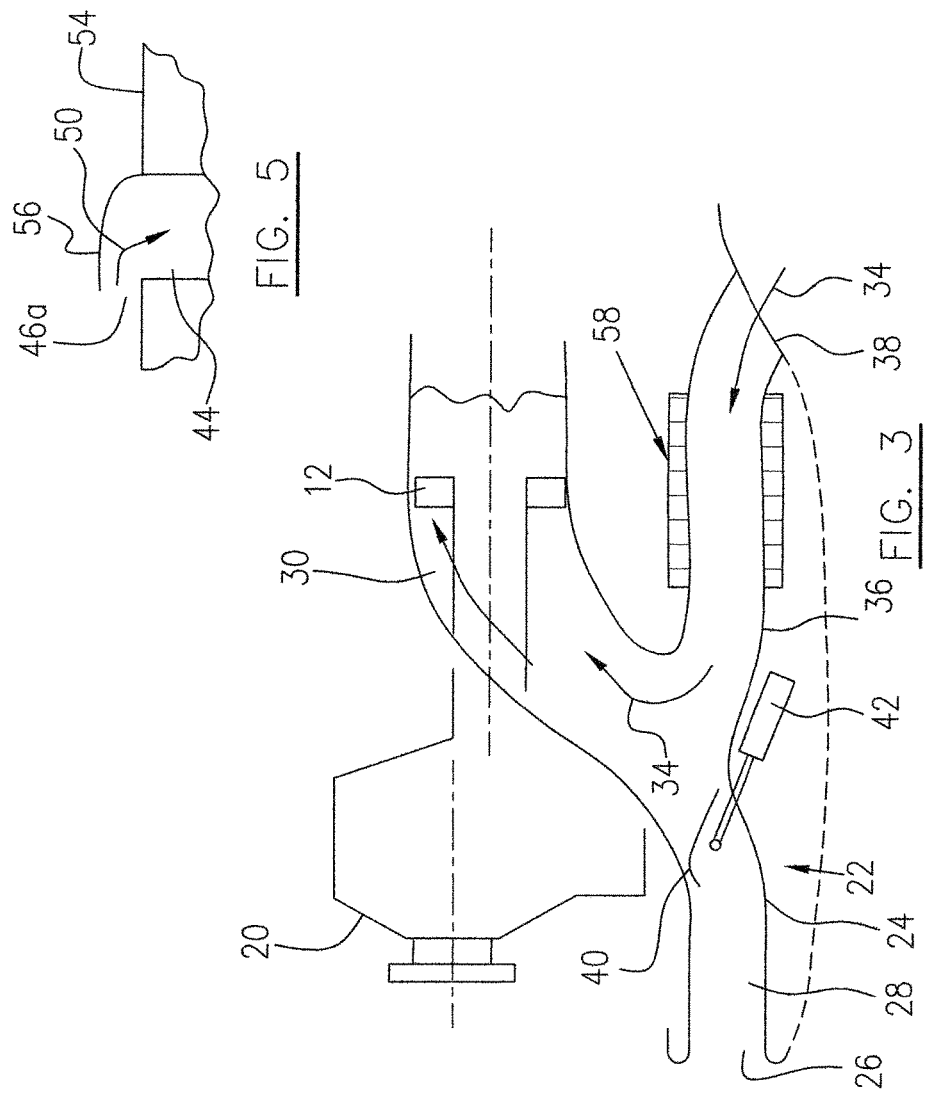
FIG. 3 is a schematic partial cross-sectional view of the turboprop aeroengine of FIG. 1, illustrating the inlet system according to one embodiment, operated to use an inertial particle separator (IPS) duct as a secondary inlet duct to replace the main inlet duct under approach or landing flight conditions.

In this engine operation model as shown in FIG. 3, the IPS duct 36 is converted to function as a secondary inlet duct to provide the secondary air flow 34 to the compressor section 12, to replace the first inlet air flow 32.

Under approach and landing flight conditions the performance of the inlet is less important than in other flight phases because the aeroengine is operated at a low power level and the condition is not maintained long enough to significantly block fuel burn. Therefore, it may be possible to switch the inlet ducting to an alternate more acoustically favourable path during approach and landing flight conditions. The IPS duct 36 functioning as the secondary inlet duct in the engine operation model shown in FIG. 3, need not meet low pressure loss requirements but can be fully optimized for noise attenuation and for minimizing line-of-sight noise radiation. In such an engine operation model, the noise generated from the compressor section is forced to change propagation directions thereof and propagates out of the engine IPS duct 36 and exit opening 38 rather than propagating directly and forwardly out of the engine through the main intake opening 26.

Compared with the upstream portion 28 of the main inlet duct 24, the IPS duct 36 functioning as the secondary inlet duct, has a relatively high length/diameter ratio which is more effective for noise attenuation. The noise propagating path has almost a 180 degree turn angle which eliminates or substantially reduces line-of-sight noise radiation. The exit opening 38 may be oriented to be rear or side facing which prevents noise propagation toward airports and surrounding areas during approach and landing flight conditions.

Optionally, the IPS duct 36 may be provided with an acoustic treatment surface area 58 on the inner surface thereof, for example equipped with a perforated inner surface or having acoustic absorption material applied on the inner surface thereof.

It should be noted that in some types of turboprop engines, heat exchangers may be configured within the IPS duct to use the bypass air flow through the IPS duct to cool oil. This cooling arrangement is not suggested when the IPS duct is intended to be converted as a secondary inlet duct as described in the above embodiments.

Figure 4:
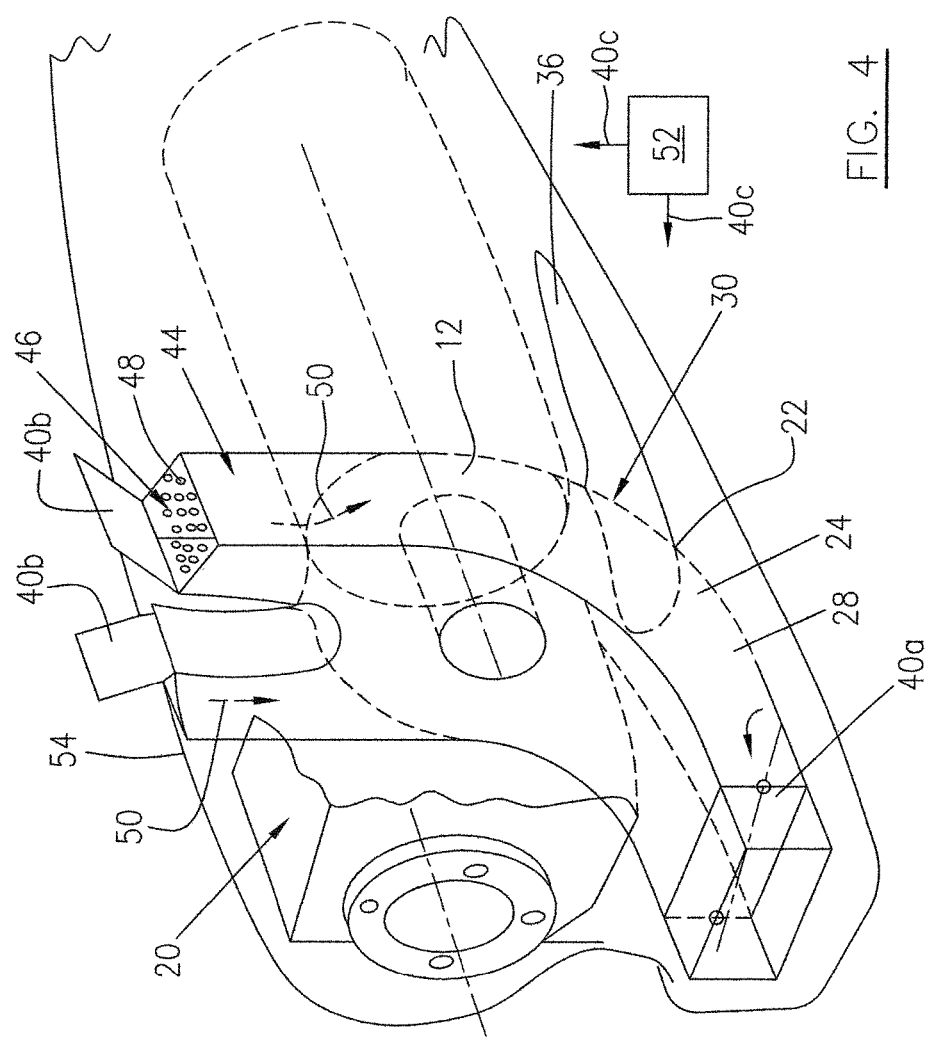
FIG. 4 is a schematic partial perspective view of the turboprop aeroengine of FIG. 1, illustrating an inlet system according to another embodiment, having a dedicated secondary inlet duct to be selectively operated to replace a main inlet duct under approach or landing flight conditions.

Referring to FIGS. 1 and 4, the inlet system 22 according to another embodiment, includes a dedicated secondary inlet duct 44 for directing a secondary inlet air flow indicated by broken arrows 50, from a secondary intake opening 46 (see FIG. 4) of the dedicated secondary inlet duct 44 to the compressor section 12, only when the main inlet duct 24 is closed. The secondary inlet duct 44 according to one embodiment, may extend substantially in a transverse direction with respect to the flight direction 25 and may be connected in fluid communication with the annular downstream portion 30 of the main inlet duct 24. The secondary inlet duct 44 may include a pair of secondary inlet branches (not numbered) in a bifurcated configuration such that the two branches may be connected in fluid communication with the annular downstream portion 30 of the main inlet duct 24, and may extend in parallel and transversely toward and terminate at the respective secondary intake openings 46 thereof. The secondary intake openings 46 in the two branches of the dedicated secondary inlet duct 44, may be located at the outer skin 54 of the nacelle of the aeroengine, and may be oriented to substantially face in a transverse direction with respect to the flight direction 25. Optionally, the dedicated secondary inlet duct 44 may extend upwardly such that the secondary intake openings 46 are oriented upwardly.

The inlet system 22 according to one embodiment, may include a valve apparatus having a main valve 40a mounted for example in the upstream portion 28 of the main inlet duct 24 and a secondary valve 40b mounted to each of the branches of the dedicated secondary inlet duct 44. It should be noted that all the valves illustrated in the drawings including valve 40 in FIGS. 1-3 and valves 40a, 40b in FIG. 4, are schematic illustrations and do not represent a structural configuration thereof. Valve movement should be coordinated to prevent excessive engine inlet pressure fluctuations or transients. The valves 40a and 40b are operated by a controller apparatus schematically illustrated by a block 52 with arrows 40c which represent the associated relationship between the controller apparatus 52 and the respective valves 40a and 40b. The controller apparatus 52 maintains the main valve 40a in the open position and the secondary valve 40b closed during normal engine operation for flight conditions other than approach and landing procedures. The control apparatus 52 may be associated with or incorporated with the engine electronic controller (EEC) (not shown). In this flight model as shown in FIG. 1, the engine intake air supply is provided by the first inlet air flow 32 entering the main intake opening 26 and passing through the upstream portion 28 and the annular downstream portion 30 of the main inlet duct 24. A small portion of the first inlet air flow 32 with particles and debris carried therein enters the IPS duct 36 to form the bypass air flow 32a to be discharged from the exit opening 38. When the aeroengine is operated under flight approach and landing conditions, the controller apparatus 52 closes the main valve 40 in the upstream portion 28 of the inlet duct 24 and simultaneously opens the secondary valves 40b mounted to the two branches of the dedicated secondary inlet duct 44, as illustrated in FIG. 4. Therefore, the first inlet air flow 32 is discontinued and the secondary inlet air flow 50 enters the two secondary intake openings 46 and passes through the two branches of the dedicated secondary inlet duct 44 and the annular downstream portion 30 of the main inlet duct 24 to be supplied to the compressor section 12 of the aeroengine.

The inlet system according to this embodiment provides a non-forward facing top inlet system to substantially reduce noise propagation toward the ground when the flight is on approach and landing. The bifurcated nature of the inlet system 22 according to this embodiment provides an effective length/diameter ratio and a non-forward facing inlet to minimize line-of-sight noise radiation. Optionally, the respective branches of the dedicated secondary inlet duct 44 may each define acoustic treatment areas 48 on inner surfaces thereof. The bifurcated nature of the dedicated secondary inlet duct 44 provides an effective acoustic treatment area.

A turboprop engine may not necessarily include an IPS duct 36. However, when the turboprop engine does have both the dedicated secondary inlet duct 44 and the IPS duct 36 and the engine is operated in the model as shown in FIG. 4 under flight approach and landing conditions, the function of the IPS duct 36 may change depending on the air pressure level within the annular downstream portion 30 of the main inlet duct 24. If the air pressure within the annular downstream portion 30 of the main inlet duct 24 is higher than the ambient air pressure, a portion of the secondary inlet air flow 50 will enter the IPS duct 36 to form a bypass air flow (not numbered) passing through the IPS duct 36 such that the IPS duct 36 maintains its bypass function to separate particles and debris from the secondary inlet air flow 50. If the air pressure within the annular downstream portion 30 of the main inlet duct 24 is lower than the ambient air pressure, the IPS duct 36 will be converted from an IPS duct to another secondary inlet duct as shown in FIG. 3, thereby drawing ambient air from the exit opening 38 thereinto to form the secondary inlet air flow 34 entering the compressor section 12.

The particular configuration of the inlet system 22 will determine the air pressure level within the annular downstream portion 30 of the main inlet 24 when the engine is performing in the operation model as shown in FIG. 4. In order to ensure that the air pressure level within the annular downstream portion 30 of the main inlet duct 24 is higher than the ambient air pressure, the secondary intake opening 46 of each of the branches of the dedicated secondary inlet duct 44 may be provided with a scoop configuration 56 as shown in FIG. 5. The scoop configuration 56 may be located outside of the outer skin 54 of the nacelle to form a forward top secondary intake opening 46a immediately above the outer skin 54 of the nacelle. The forward top secondary intake opening 46a will significantly increase the air pressure level within the annular downstream portion 30 of the main inlet 24 such that the IPS duct 36 can maintain function as a bypass duct particle separation system which may be desirable under flight conditions near the ground where it is most likely to be needed.

The above description is meant to be exemplary only, and one skilled in the art will recognize that changes may be made to the embodiments described without departing from the scope of the described subject matter. The described subject matter may be applicable to any suitable aeroengine, such as those different from the turboprop engine as illustrated in the drawings, with reference to which the above embodiments are described. Any suitable arrangement and number of intakes may be provided. Any suitable control apparatus may be used. Modifications which fall within the scope of the described subject matter will be apparent to those skilled in the art, in light of a review of this disclosure, and such modifications are intended to fall within the appended claims.

The invention claimed is:

1. A compressor inlet system for an aeroengine, the compressor inlet system comprising: a main inlet duct for directing a first air flow from a main intake opening to a compressor, the main intake opening defined at a forward end of the compressor inlet system with respect to a flight direction, a secondary inlet duct in fluid communication with the main inlet duct for directing a second air flow from a secondary opening to the compressor, and a control apparatus for selecting which of the first and second air flows to provide to the compressor, the control apparatus comprising a main valve selectively opening the main inlet duct for directing a portion of the first air flow to bypass the compressor and to be discharged from the secondary opening when the first air flow is selected to enter the compressor, and selectively closing the main inlet duct to discontinue the first air flow and to thereby cause the secondary inlet duct to draw air from the secondary opening, wherein the secondary inlet duct is operable to function as an inertial particle separator (IPS) duct of the compressor inlet system, the IPS duct extending from the main inlet duct rearward and terminating at the secondary opening, the secondary opening being a rear opening of the IPS duct, the main valve selectively opening the main inlet duct to operate the IPS duct such that particles and debris carried by the first air flow keep a motion thereof substantially rearward and pass through the IPS duct to be discharged out of the rear opening, the main valve selectively closing the main inlet duct to discontinue the first air flow causing the secondary inlet duct to draw air from the secondary opening for directing the second air flow to the compressor.

2. The compressor inlet system as defined in claim 1 wherein the control apparatus is configured so that the second air flow flows to the compressor only when the main inlet duct is closed to discontinue the first air flow.

3. The compressor inlet system as defined in claim 1 wherein the main inlet duct and the secondary inlet duct share a common downstream portion.

4. The compressor inlet system as defined in claim 1 wherein the main valve is positioned within the main inlet duct, upstream of a location at which the IPS duct is connected to the main inlet duct with respect to the first air flow.

5. The compressor inlet system as defined in claim 1 wherein the secondary inlet duct comprises an acoustic treatment area on an inner surface thereof.

6. The compressor inlet system as defined in claim 1 wherein the secondary inlet duct is in fluid communication with the main inlet duct and extends substantially in a transverse direction with respect to the flight direction.

7. The compressor inlet system as defined in claim 1 wherein the control apparatus comprises the main valve mounted to and for selectively closing the main inlet duct to discontinue the first air flow, and a secondary valve mounted to and for selectively closing the secondary inlet duct and being only open when the main valve is closed.

8. The compressor inlet system as defined in claim 1 wherein the secondary opening is oriented substantially facing a transverse direction with respect to the flight direction.

9. The compressor inlet system as defined in claim 1 wherein the secondary opening is oriented substantially facing forwardly with respect to the flight direction.

10. The compressor inlet system defined in claim 1, wherein the main inlet duct is connected in fluid communication with an annular duct for selectively directing the first air flow from the main intake opening of the main inlet duct to a compressor rotor located downstream of the annular duct with respect to the first air flow, the secondary inlet duct extends substantially in a transverse direction with respect to the flight direction and is connected in fluid communication with the annular duct for selectively directing the second air flow from the secondary opening through the annular duct to the compressor rotor, and the compressor inlet system includes a secondary valve for selectively closing the secondary inlet duct and being only open when the main inlet duct is closed.

11. An aeroengine comprising: an inlet system with a forward end with respect to a flight direction, the inlet system comprising a main inlet duct for selectively directing a first air flow from a forward main intake opening of the main inlet duct to a compressor rotor, the forward main intake opening being defined at the forward end of the inlet system, an inertial particle separator (IPS) duct connected in fluid communication with the main inlet duct and extending rearward for directing a portion of the first air flow to bypass the compressor rotor and to be discharged through an exit opening of the IPS, the exit opening being disposed in a rear location with respect to the forward end of the inlet system, and a valve mounted to the main inlet duct in a location upstream of the IPS duct with respect to the first air flow, the valve selectively opening the main inlet duct to operate the IPS duct such that particles and debris carried by the first air flow keep a motion thereof substantially rearward and pass through the IPS duct to be discharged out of the rear opening, the valve selectively closing the main inlet duct to discontinue the first air flow such that the IPS duct draws a second air flow from the exit opening and directs the second air flow to the compressor rotor.

12. The aeroengine as defined in claim 11 wherein the inlet system comprises an annular duct connected in fluid communication with the main inlet duct and positioned immediately upstream of the compressor rotor, the IPS duct being connected to the main inlet duct immediately upstream of the annular duct.

13. The aeroengine as defined in claim 11 wherein the IPS duct extends from the main inlet duct substantially rearward and terminates at the exit opening.

14. The aeroengine as defined in claim 11 wherein the IPS duct comprises an acoustic treatment area on an inner surface thereof.

15. An aeroengine comprising: an inlet system with a forward end with respect to a flight direction, the inlet system comprising a main inlet duct connected in fluid communication with an annular duct for selectively directing a first air flow from a forward main intake opening of the main inlet duct to a compressor rotor located downstream of the annular duct with respect to the first air flow, the forward main intake opening being defined at the forward end of the inlet system, and a secondary inlet duct having a secondary intake opening and extending substantially in a transverse direction with respect to the flight direction and being connected in fluid communication with the annular duct, the secondary inlet duct selectively directing a secondary air flow from the secondary intake opening through the annular duct to the compressor rotor, and an inertial particle separator (IPS) duct connected in fluid communication with the main inlet duct immediately upstream of the annular duct and extending rearward for directing a portion of the first air flow to bypass the compressor rotor and to be discharged through an exit opening at a rear end of the IPS duct, the inlet system including a valve apparatus having a main valve for selectively opening the main inlet duct to operate the IPS duct such that particles and debris carried by the first air flow keep a motion thereof substantially rearward and pass through the IPS duct to be discharged out of the rear opening, the main valve selectively closing the main inlet duct to discontinue the first air flow, and a secondary valve device for selectively closing the secondary inlet duct and being only open when the main inlet duct is closed.

16. The aeroengine as defined in claim 15 wherein the secondary inlet duct comprises a pair of secondary inlet branches in a bifurcated configuration, the secondary inlet branches being connected in fluid communication with the annular duct, each of the secondary inlet branches having said secondary intake opening, the secondary valve device selectively and simultaneously closing or opening both of the secondary inlet branches.

17. The aeroengine as defined in claim 16 wherein each of the secondary intake openings is oriented facing forwardly with respect to the flight direction in order to increase a pressure of the secondary air flow to a level greater than an ambient air pressure in order to prevent the IPS duct from drawing the ambient air through the exit opening.

18. The aeroengine as defined in claim 16 wherein each of the secondary inlet branches comprises an acoustic treatment area on an inner surface thereof.

* * * * *